United States Patent
Williams et al.

[11] Patent Number: 5,977,744
[45] Date of Patent: Nov. 2, 1999

[54] VEHICLE BATTERY CONTROLLER

[75] Inventors: Geoffrey Allan Williams, Coventry; Neville Gresty, Cheshire, both of United Kingdom

[73] Assignee: Lucas Industries, Solihull, United Kingdom

[21] Appl. No.: 08/955,675

[22] Filed: Oct. 22, 1997

[30] Foreign Application Priority Data

Oct. 26, 1996 [GB] United Kingdom ............... 9622307

[51] Int. Cl.⁶ ..................... H01M 10/44; H01M 10/46
[52] U.S. Cl. ............................................... 320/104
[58] Field of Search ................................ 320/103, 104, 320/120, 121, 132; 180/65.1; 307/10.1, 44, 46, 48, 49

[56] References Cited

U.S. PATENT DOCUMENTS

| | | | |
|---|---|---|---|
| 3,763,415 | 10/1973 | Ownby | 320/117 |
| 4,264,855 | 4/1981 | Ghibaudo et al. | 320/124 |
| 5,194,799 | 3/1993 | Tomantschger | |
| 5,225,761 | 7/1993 | Albright | 320/117 |
| 5,285,862 | 2/1994 | Furutani et al. | 180/65.4 |
| 5,418,444 | 5/1995 | Cook et al. | 320/125 |
| 5,488,283 | 1/1996 | Dougherty et al. | 307/10.1 |
| 5,635,771 | 6/1997 | Mertl et al. | 307/10.7 |

FOREIGN PATENT DOCUMENTS

| | | |
|---|---|---|
| 4422231 | 1/1996 | Germany . |
| 2255243 | 10/1992 | United Kingdom . |
| 2292274 | 2/1996 | United Kingdom . |
| 2302622 | 1/1997 | United Kingdom . |

*Primary Examiner*—Edward H. Tso
*Attorney, Agent, or Firm*—Wells, St. John, Roberts, Gregory & Matkin, P.S.

[57] ABSTRACT

The vehicle battery controller includes a controller for interconnecting an auxiliary battery to a main battery for engine starting or charging. If the auxiliary battery voltage is lower than a first threshold before engine starting its subsequent use is inhibited. If the main battery voltage exceeds the auxiliary battery voltage by more than a predetermined margin, the auxiliary battery is not used for engine starting. When the engine is running and the charging system is operating, the auxiliary battery is disconnected when the common voltage is below a second threshold.

17 Claims, 3 Drawing Sheets

VEHICLE BATTERY CONTROLLER

TECHNICAL FIELD

The present invention relates to a vehicle battery controller. Such a controller may be used for controlling the connection of a rechargeable auxiliary battery to a rechargeable main battery of a vehicle electrical system of the type including an engine-driven battery charger. In such a system, the auxiliary battery may be used during engine starting and may be recharged during engine running.

BACKGROUND OF THE INVENTION

In automotive vehicles, it is known to provide the electrical system with a rechargeable battery, such as a lead-acid accumulator, which is recharged by an engine-driven battery charger, such as an alternator or dynamo. The battery is used to start or "crank" the engine, such as an internal combustion engine, and to supply electrical power to the electrical system when the engine-driven charger cannot supply sufficient power, for instance, at relatively low engine speeds. For higher engine speeds, the charger supplies power to the electrical system and recharges the battery until it is recharged to its normal maximum working capacity It is also known to provide a rechargeable auxiliary battery, such as a lead-acid accumulator, to assist in starting the engine. The auxiliary battery is also recharged by the engine-driven battery charger and, once recharged to its maximum normal capacity, is isolated from the electrical system.

According to the invention, there is provided a vehicle battery controller for controlling the connection of a rechargeable auxiliary battery to a rechargeable main battery of a vehicle electrical system including an engine-driven battery charger, the controller comprising a first comparison means for connecting the auxiliary battery to the main battery during engine starting if the auxiliary battery voltage is greater than a first threshold, and a second comparison means for disconnecting the auxiliary battery from the main battery during engine running if a battery voltage is less than a second threshold.

The battery voltage which is measured during engine running when the auxiliary battery is connected to the main battery is effectively a common battery voltage and may be measured at any suitable point of the electrical system, such as at the auxiliary battery or at the main battery. The auxiliary battery voltage is preferably measured at the auxiliary battery so as to avoid the effects of voltage differences occurring between the auxiliary battery and other points in the electrical system, for instance caused by the flow of current through the finite resistance of conductors.

Preferably the second comparison means is arranged, after disconnection of the auxiliary battery from the main battery, to connect the auxiliary battery to the main battery if the main battery voltage is greater than a third threshold. Preferably the third threshold is substantially equal to the second threshold.

Preferably the controller is arranged, after disconnection of the auxiliary battery from the main battery, to measure a first voltage change of the auxiliary battery voltage and a second voltage change of the main battery voltage. Preferably the controller is arranged to connect the auxiliary battery to the main battery if the first voltage change is negative and the second voltage change is positive. Preferably the controller is arranged to decrement the second threshold if the first voltage change is negative and the second voltage change is positive. Preferably the controller is arranged to increment the second threshold if the first voltage change is positive and the second voltage change is negative.

According to another aspect of the invention, there is provided a vehicle electrical system including a controller according to the invention.

Preferably the controller is arranged to control a switch, such as a contactor, connected between the auxiliary battery and the main battery. This is thus possible to provide an arrangement which will reliably allow a vehicle engine to be started after lack of use for a substantial time period. During such lack of use, various loads such as clocks and alarms systems remain connected to the main battery and may, after a sufficient time period, discharge the main battery to such an extent that it is unable to start the engine. Such a situation is aggravated in cold conditions where the main battery capacity is further reduced. During lack of use, the auxiliary battery is isolated and so is not discharged by any loads within the vehicle. In normal circumstances and in cold conditions, the auxiliary battery retains sufficient charge to allow the vehicle engine to be started, irrespective of the condition of the main battery.

In accordance with another object of the invention there is provided a method of controlling the use of an auxiliary battery in a vehicle electrical system which includes a main battery, an auxiliary battery, an engine starting apparatus and an engine-driven battery charger, the method comprising the steps of:

(a) comparing the auxiliary battery voltage with a first threshold before the engine is started and preventing connection of the auxiliary battery to the main battery if the auxiliary battery voltage is less then said threshold;

(b) comparing the excess of the main voltage battery over the auxiliary voltage battery with a predetermined margin;

(c) connecting the auxiliary battery to the main battery after an engine starting operation if the excess exceeds the margin, but before the engine starting operation otherwise;

(d) comparing the common battery voltage when the engine is running and the batteries are interconnected with a second threshold; and (e) disconnecting the auxiliary battery from the main battery if the common battery voltage is less then said second threshold.

BRIEF DESCRIPTION OF THE DRAWINGS

The invention will be further described, by way of example, with reference to the accompanying drawings, in which.

DETAILED DESCRIPTION OF THE PREFERRED EMBODIMENTS

Figure 1:
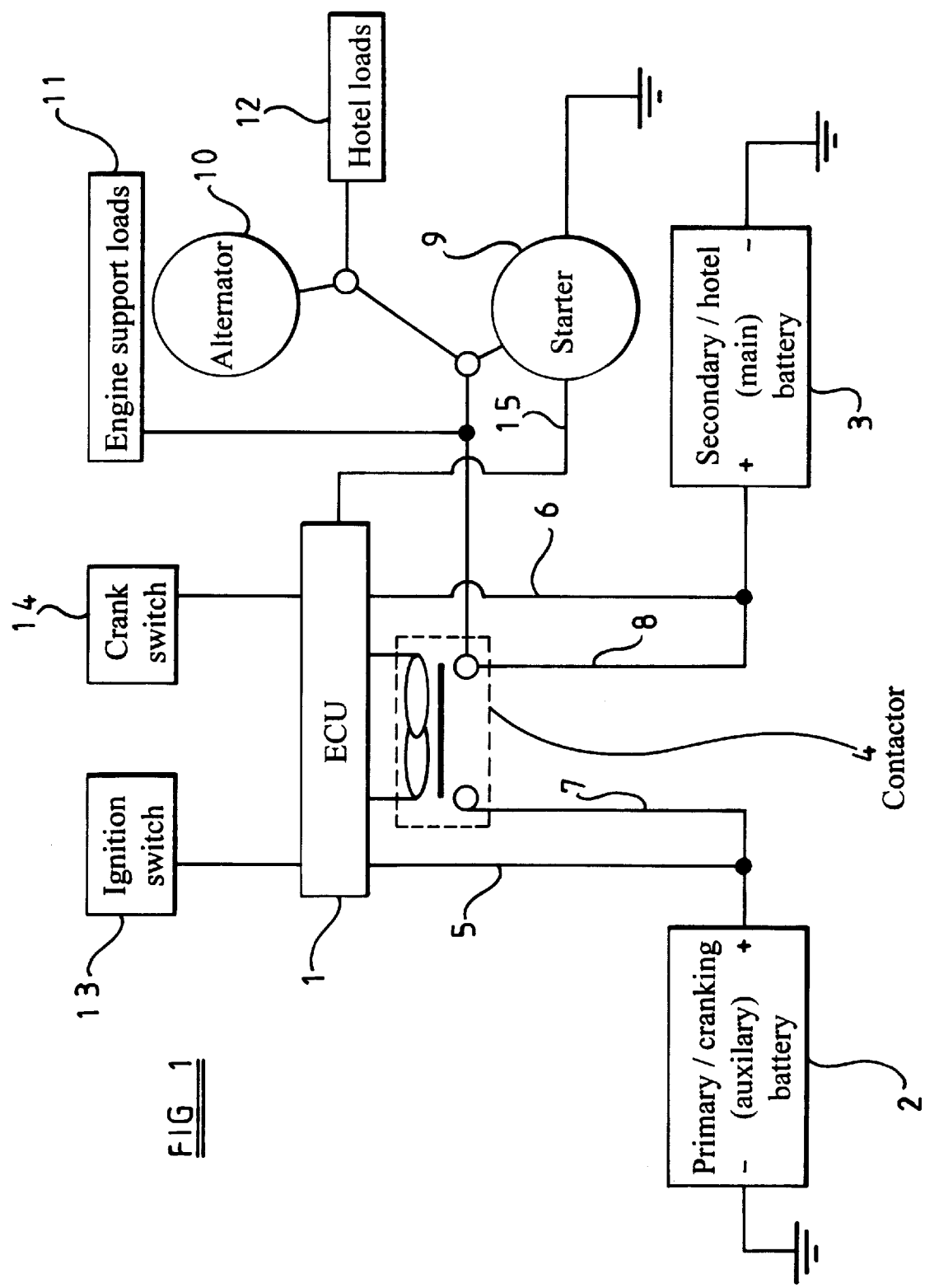
FIG. 1 is a block schematic diagram of part of a vehicle electrical system including a controller constituting an embodiment of the invention.

The vehicle electrical system shown in FIG. 1 comprises an electrical control unit 1 for controlling the vehicle electrical system. The control unit 1 may, for instance, comprise one or more micro-controllers programmed to perform ail of the functions necessary to control the engine, such as an internal combustion engine, of the vehicle and all other electrical circuitry within the vehicle. In particular, the control unit 1 includes a battery controller which may be embodied by one of the micro-controllers programmed by suitable software.

The electrical system further comprises an auxiliary battery 2, also known as a primary or cranking battery, which is connectable to a main battery, also known as a secondary or hotel battery 3, by means of a contactor 4 controlled by the control unit 1. The batteries 2 and 3 may, for instance, be located remotely from the control unit 1, for instance in the boot or rear luggage compartment of the vehicle. For a front-engined vehicle, the control unit 1 is normally located in the engine compartment at the front of the vehicle. The control unit 1 has inputs connected by leads 5 and 6 to the terminals of the batteries 2 and 3 so as to measure the auxiliary and main battery voltages. This arrangement avoids the effects of voltage drops along the conductors 7 and 8 which carry the electrical currents supplied by the batteries 2 and 3 and which give rise to voltage drops.

The main battery 3 is permanently connected to an engine starter 9 in the form of an electric motor which is connectable via a gear arrangement to the engine output shaft. The main battery 3 is also permanently connected to an engine-driven alternator 10, to engine support loads 11, and to other continuously connected loads, known as "hotel loads" 12, such as a vehicle clock, alarm system, electromagnetic door lock system, and vehicle lighting system.

The control unit 1 is connected to an ignition switch 13 for controlling connection of the battery 3 to non-permanently connected loads such as an engine ignition system and fuelling system. The control unit 1 is also connected to a crank switch 14 for supplying a signal requesting engine starting. The control unit 1 has an output connected by a lead 15 to the starter 9 for controlling starting of the engine.

Figure 2:
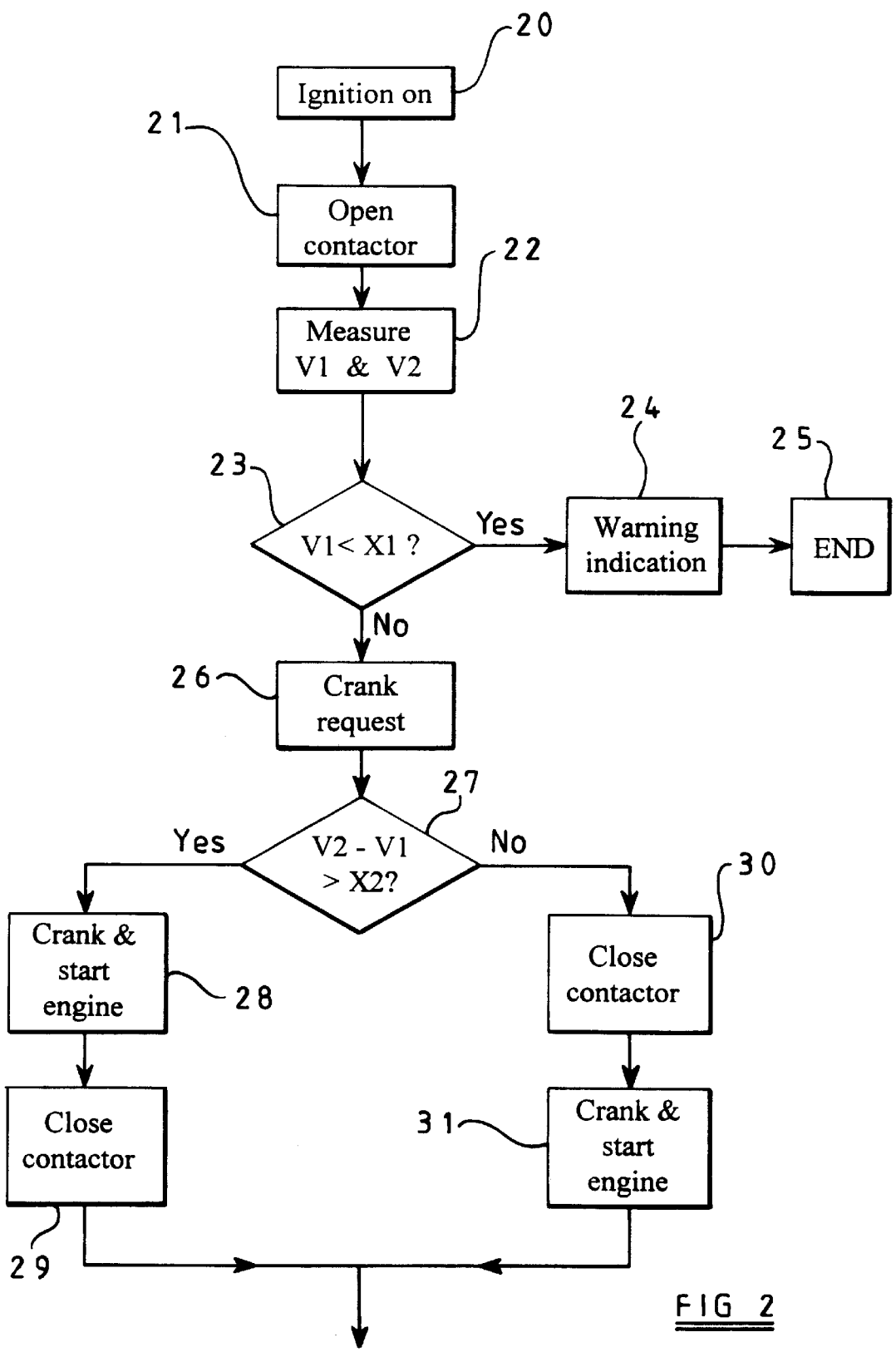
FIGS. 2 and 3 are flow diagrams illustrating operation of the controller of FIG. 1.
Figure 3:
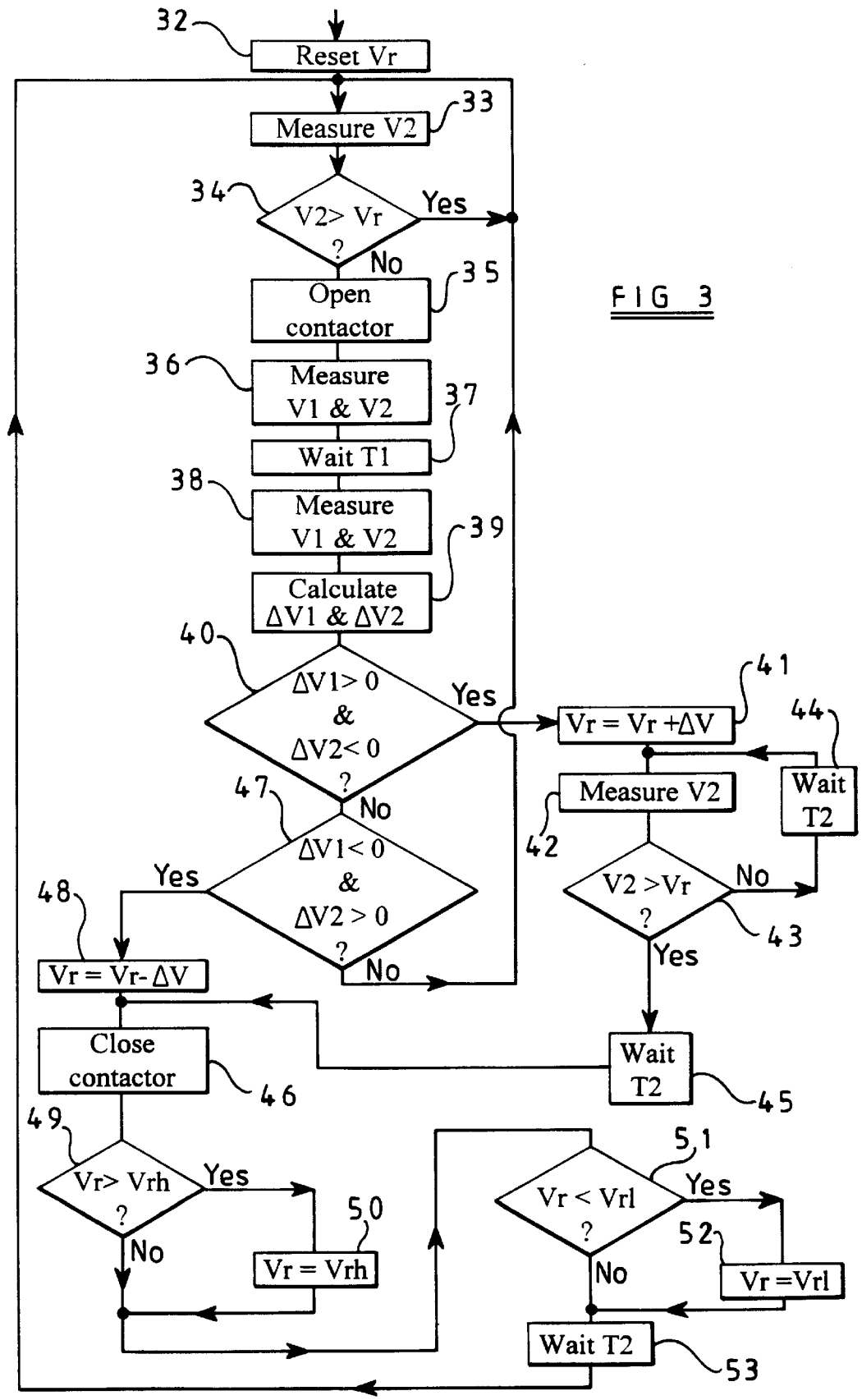

Operation of the vehicle battery controller within the control unit 1 is illustrated in FIGS. 2 and 3. Operation begins at step 20 by manual operation of the ignition switch 13, for instance prior to starting the engine. At step 21, the controller ensures that the contactor 4 is open so that the auxiliary battery 2 is isolated from the main battery 3, and the rest of the vehicle electrical system. At step 22, the controller measures the terminal voltages V1 and V2 of the auxiliary battery 2 and the main battery 3, respectively. At step 23, the controller compares the auxiliary battery voltage V1 with a threshold voltage X1, for instance approximately 9.25 volts to establish the state of charge of the auxiliary battery 2. If the auxiliary battery voltage V1 is less than the threshold X1, a warning indication is given at 24, for instance by illuminating a warning lamp on a dashboard of the vehicle. Operation of the controller then ends at 25 with the contactor 4 remaining open so as to allow the vehicle to be operated by means of the main battery 3. The step 23 thus ensures that the auxiliary battery 2 when in a poor state of charge cannot have a detrimental effect on vehicle operation, for instance by discharging the main battery 3 to such an extent that the vehicle cannot be started. Such a situation may occur if the auxiliary battery 2 is in a poor state of health or has not been properly recharged by the alternator 10 during previous use of the vehicle. After starting the vehicle, during the journey, the battery may be checked by closing the contactor and attempting to charge in order to check whether the decision was correct.

If the state of charge of the auxiliary battery 2 is adequate, the controller waits until a crank request 26 is received as a result of manual actuation of the crank switch 14. At 27, the controller tests whether the auxiliary battery voltage V1 is less than the main battery voltage V2 by more than a threshold X2, for instance equal to 0.625 volts. If this is the case, the contactor 4 remains open and the engine is cranked and started at 28, after which the contactor is closed at 29 to permit recharging of the auxiliary battery 2 by the alternator 10 with the engine running. Alternatively, if the main battery voltage V2 does not exceed the primary voltage V1 by more than the threshold X2, the contactor 4 is closed at 30 and the engine cranked and started at 31. Thus, the operation of the controller illustrated in FIG. 2 ends with the engine running and the contactor 4 closed, whereupon operation is as illustrated in FIG. 3.

At 32, a reference voltage Vr is reset, for instance to approximately 13 volts.

At 33, main battery voltage V2 is measured. The main battery voltage V2 is compared, at 34 with the reference voltage Vr. If the main battery voltage is greater than the reference voltage, control returns to the step 33. Thus, the main battery voltage V2, which is also a measure of the auxiliary battery voltage because the contactor 4 is closed, is monitored to ensure that the batteries are being properly charged by the alternator 10.

If proper recharging is not taking place such that the voltage V2 is not greater than the reference voltage Vr, the contactor 4 is opened at 35 and the effect of this is determined at 36 by measuring the auxiliary and main battery voltages V1 and V2. The controller then waits at 37 for a time period T1, for instance of a few seconds, before again measuring the battery voltages at 38. At 39, the changes in battery voltages are calculated from the previous two measurements of the battery voltages so as to ascertain whether the auxiliary and main battery voltages are rising or falling. At 40, the battery voltages are tested to ascertain whether the auxiliary battery voltage has increased and the main battery voltage has decreased. This will occur if the load presented by the electrical system is more than can be supplied by the alternator 10 so that the decision to open the contactor 4 and isolate the auxiliary battery 2 was correct. In this case, the reference voltage Vr is incremented by $\Delta V$ at 41 and the main battery voltage V2 is measured at 42. If the main battery voltage V2 is not greater than the new reference voltage Vr as tested at 43, the controller waits for a time period T2, for example a few seconds, at 44 and then repeats the steps 42 and 43. When the main battery voltage V2 exceeds the reference voltage Vr, the controller again waits at 45 before closing the contactor at step 46. This occurs when the alternator 10 is supplying sufficient power to meet the requirements of the vehicle loads and recharge the main battery 3, so that the auxiliary battery 2 may again be connected to the main battery by the contactor 4 for recharging by the alternator 10.

If the result of the test 40 is negative, a step 47 is performed to test if the auxiliary battery voltage V1 is falling and the main battery voltage V2 is rising. This situation indicates that the decision to open the contactor 4 was incorrect so that the reference voltage Vr is decremented by $\Delta V$ at 48 and the contactor is closed at 46. Otherwise, control returns to 33.

A step 49 tests whether the reference voltage Vr exceeds a maximum value Vrh and, if so, resets the reference voltage Vrh at 50. Similarly, a step 51 tests whether the reference voltage Vr is below a minimum reference voltage Vrl and, resets the reference voltage to Vrl at 52. Examples of values for Vrh and Vrl are 13 and 12.5 volts, respectively. The controller then waits at 53 for a time period T2 after which control returns to the step 33.

The steps 41 and 48 together with the associated steps adapt the threshold Vr to overcome problems which might otherwise occur if the charge in the auxiliary battery 2 falls significantly. In such circumstances, the use of a fixed threshold Vr may result in not enough charge being supplied by the alternator 10 to the battery 2 so as to recharge it to its normal maximum charge. By adapting the threshold Vr, the controller ensures that, irrespective of the initial state of charge of the auxiliary battery 2 and hence its terminal voltage, the electrical system recharges the auxiliary battery 2 correctly.

It is thus possible to provide an arrangement which ensures with a high degree of reliability that the auxiliary battery 2 is only connected, when the engine is running, to the electrical system under circumstances which ensure that the auxiliary battery is not undesirably discharged. The auxiliary battery 2 therefore remains capable of allowing the engine to be started, for instance following discharge of the main battery 3 as a result of the vehicle engine not operating for a substantial period of time despite the constant electrical loads, such as a vehicle clock and a vehicle alarm system, imposed on the battery 3.

We claim:

1. A vehicle battery controller for controlling the connection of a rechargeable auxiliary battery to a rechargeable main battery of a vehicle electrical system including an engine-driven battery charger, the controller comprising a first comparison means for connecting the auxiliary battery to the main battery during engine starting if the auxiliary battery voltage is greater than a first threshold, and a second comparison means for disconnecting the auxiliary battery from the main battery during engine running if the battery voltage produced by said connection of said auxiliary battery to said main battery is less than a second threshold.

2. A vehicle battery controller for controlling the connection of a rechargeable auxiliary battery to a rechargeable main battery of a vehicle electrical system including an engine-driven battery charger, the controller comprising a first comparison means for connecting the auxiliary battery to the main battery during engine starting if the auxiliary battery voltage is greater than a first threshold, and a second comparison means for disconnecting the auxiliary battery during engine running if the battery voltage produced by said connection of said auxiliary battery is less than a second threshold, and wherein said second comparison means is arranged, after disconnection of the auxiliary battery from the main battery, to connect the auxiliary battery if the main battery voltage is greater than a third threshold.

3. A vehicle battery controller as claimed in claim 2 in which said third threshold is substantially equal to the second threshold.

4. A controller as claimed in claim 2 arranged so as, after disconnection of the auxiliary battery from the main battery, to measure a first voltage change of the auxiliary battery voltage and a second voltage change of the main battery voltage.

5. A controller as claimed in claim 4 in which the controller is arranged to connect the auxiliary battery to the main battery if the first voltage change is negative and the second voltage change is positive.

6. A controller as claimed in claim 4 in which the controller is arranged to decrement the second threshold if the first voltage change is negative and the second voltage change is positive.

7. A controller as claimed in claim 4 in which the controller is arranged to increment the second threshold if the first voltage change is positive and the second voltage change is negative.

8. A controller as claimed in claim 2 in which said first comparison means is arranged to connect the auxiliary battery to the main battery after an engine starting operation if the voltage of the main battery exceeds that of the auxiliary battery by more than a predetermined margin, but to connect the auxiliary battery to the main battery before the engine starting operation otherwise.

9. A vehicle system as claimed in claim 2 wherein the first and second comparison means comprise a controller for controlling connection of the auxiliary battery to the main battery.

10. A vehicle electrical system as claimed in claim 9 further comprising a switch connected between the main battery and the auxiliary battery, said switch being controlled by said controller.

11. A method of controlling the use of an auxiliary battery in a vehicle electrical system which includes a main battery, an auxiliary battery, an engine starting apparatus and an engine-driven battery charger, the method comprising the steps of:

(a) comparing the auxiliary battery voltage with a first threshold before the engine is started and preventing connection of the auxiliary battery to the main battery if the auxiliary battery voltage is less than said threshold;

(b) comparing the excess of the main voltage battery over the auxiliary voltage battery with a predetermined margin;

(c) connecting the auxiliary battery to the main battery after an engine starting operation if the excess exceeds the margin, but before the engine starting operation otherwise;

(d) comparing the common battery voltage when the engine is running and the batteries are interconnected with a second threshold; and (e) disconnecting the auxiliary battery from the main battery if the common battery voltage is less than said second threshold.

12. A method as claimed in claim 11 comprising the further steps of:

(f) comparing the main battery voltage when the engine is running and the auxiliary battery is disconnected from the main battery with a third threshold; and (g) reconnecting the auxiliary battery to the main battery if the main battery voltage is greater than said third threshold.

13. A method as claimed in claim 12 in which said third threshold is equal to said second threshold.

14. A method as claimed in claim 13 further comprising the steps of:

(i) determining a first change in the voltage of the auxiliary battery and a second change in the voltage of the main battery during an interval (T1) when the engine is running and the batteries are not interconnected; and (ii) varying said second threshold in accordance with the first and second changes.

15. A method as claimed in claim 14 including the step of decrementing said second threshold if said first change is negative and the second change is positive.

16. A method as claimed in claim 15 including the step of connecting the auxiliary battery to the main battery if said first change is negative and the second change is positive.

17. A method as claimed in claim 14 including the step of incrementing the second threshold if the first change is positive and the second change is negative.

\* \* \* \* \*